United States Patent
Tamura

(10) Patent No.: US 10,837,524 B2
(45) Date of Patent: Nov. 17, 2020

(54) ONE-WAY CLUTCH THAT REDUCES OCCURRENCE OF RATCHET SKIP, AND FIXING DEVICE AND IMAGE FORMING APPARATUS

(71) Applicant: KYOCERA Document Solutions Inc., Osaka (JP)

(72) Inventor: Yuki Tamura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 615 days.

(21) Appl. No.: 15/682,116

(22) Filed: Aug. 21, 2017

(65) Prior Publication Data

US 2018/0087604 A1    Mar. 29, 2018

(30) Foreign Application Priority Data

Sep. 26, 2016   (JP) .................................. 2016-187404

(51) Int. Cl.
*F16H 3/54*   (2006.01)
*F16D 41/22*   (2006.01)
(Continued)

(52) U.S. Cl.
CPC .............. *F16H 3/54* (2013.01); *F16D 41/22* (2013.01); *F16D 48/064* (2013.01);
(Continued)

(58) Field of Classification Search
CPC ........... F16H 3/54; F16D 41/22; F16D 48/064
(Continued)

(56) References Cited

U.S. PATENT DOCUMENTS 9,671,732 B2 * 6/2017 Fukunaga ........... G03G 15/2064
9,897,937 B2 * 2/2018 Jung ................... G03G 21/1857
(Continued)

FOREIGN PATENT DOCUMENTS

CN       104808465 A      7/2015
JP         7-61619 A       3/1995
(Continued)

OTHER PUBLICATIONS

Chinese Office Action dated Jan. 20, 2020, issued to Chinese Application No. 201710761715.2.
(Continued)

*Primary Examiner* — Ha Dinh Ho
(74) *Attorney, Agent, or Firm* — Stein IP, LLC

(57) ABSTRACT

A one-way clutch includes a first gear, a second gear, a transmission unit, and a stretchable member. The first gear has one side in an axial direction on which a first ratchet portion is formed. The second gear includes a shaft portion, an outer peripheral portion, and a connection wall. The connection wall has a surface extending in the axial direction and connects between the shaft portion and the outer peripheral portion. The transmission unit transmits a torque of one of the first gear and the second gear to another by rotating forward around the shaft. The transmission unit includes a second ratchet portion that fits into the first ratchet portion on the first gear side. The transmission unit includes a contact portion that contacts the surface on the second gear side. The stretchable member presses the second gear to the transmission unit in a shrunk state.

6 Claims, 16 Drawing Sheets

(51) Int. Cl.
*F16D 48/06* (2006.01)
*G03G 21/16* (2006.01)
*G03G 15/20* (2006.01)
*G03G 15/16* (2006.01)
*G03G 15/00* (2006.01)

(52) U.S. Cl.
CPC ..... *G03G 15/1615* (2013.01); *G03G 15/2053* (2013.01); *G03G 21/1647* (2013.01); *G03G 15/2032* (2013.01); *G03G 15/6529* (2013.01); *G03G 2221/1657* (2013.01)

(58) Field of Classification Search
USPC .......................................................... 74/373
See application file for complete search history.

(56) References Cited

U.S. PATENT DOCUMENTS

| | | | |
|---|---|---|---|
| 2015/0212456 A1* | 7/2015 | Imaizumi | B65H 29/125 |
| | | | 74/665 G |
| 2015/0212466 A1 | 7/2015 | Fukunaga et al. | |
| | | | G03G 15/2053 |
| 2016/0070199 A1* | 3/2016 | Oh | F16H 1/20 |
| | | | 399/258 |

FOREIGN PATENT DOCUMENTS

| JP | H 10-142996 A | 5/1998 |
|---|---|---|
| WO | WO 2013/132572 A1 | 9/2013 |

OTHER PUBLICATIONS

European Search Report dated Apr. 9, 2018, issued to European Application No. 17193093.6.

* cited by examiner

ONE-WAY CLUTCH THAT REDUCES OCCURRENCE OF RATCHET SKIP, AND FIXING DEVICE AND IMAGE FORMING APPARATUS

INCORPORATION BY REFERENCE

This application is based upon, and claims the benefit of priority from, corresponding Japanese Patent Application No. 2016-187404 filed in the Japan Patent Office on Sep. 26, 2016, the entire contents of which are incorporated herein by reference.

BACKGROUND

Unless otherwise indicated herein, the description in this section is not prior art to the claims in this application and is not admitted to be prior art by inclusion in this section.

For example, there is known a typical overrunning clutch (a one-way clutch) that is constituted of a power input unit, a power transmission unit, and a power output unit and transmits a rotatory power only in one direction. In the overrunning clutch, the power input unit, the power transmission unit, and the power output unit are aligned in order of these description. The power input unit includes a protrusion. The power transmission unit includes a cutout into which the protrusion is fitted on its power input unit side and a ratchet pawl on its power output unit side. The power output unit includes a ratchet concave portion into which the ratchet pawl is fitted. With the constitution described above, fitting the protrusion to the cutout in association with rotation of the power input unit in one direction causes the power transmission unit to move to the power output unit side. Furthermore, in association with movement of the power transmission unit, the ratchet pawl is fitted into the ratchet concave portion to rotate the power output unit.

SUMMARY

A one-way clutch according to one aspect of the disclosure includes a first gear, a second gear, a transmission unit, and a stretchable member. The first gear has one side in an axial direction on which a first ratchet portion is formed. The second gear is coaxially arranged with a shaft of the first gear. The second gear includes a shaft portion, an outer peripheral portion, and a connection wall. The connection wall has a surface extending in the axial direction and connects between the shaft portion and the outer peripheral portion. The transmission unit is arranged between the first gear and the second gear. The transmission unit transmits a torque of one of the first gear and the second gear to another by rotating forward around the shaft. The transmission unit includes a second ratchet portion that fits into the first ratchet portion on the first gear side. The transmission unit includes a contact portion that contacts the surface on the second gear side. The stretchable member is arranged on a side opposite to the transmission unit by sandwiching the second gear. The stretchable member is stretchable in the axial direction and presses the second gear to the transmission unit in a shrunk state. The one of the first gear and the second gear is configured to be an input gear, and the other is configured to be an output gear.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
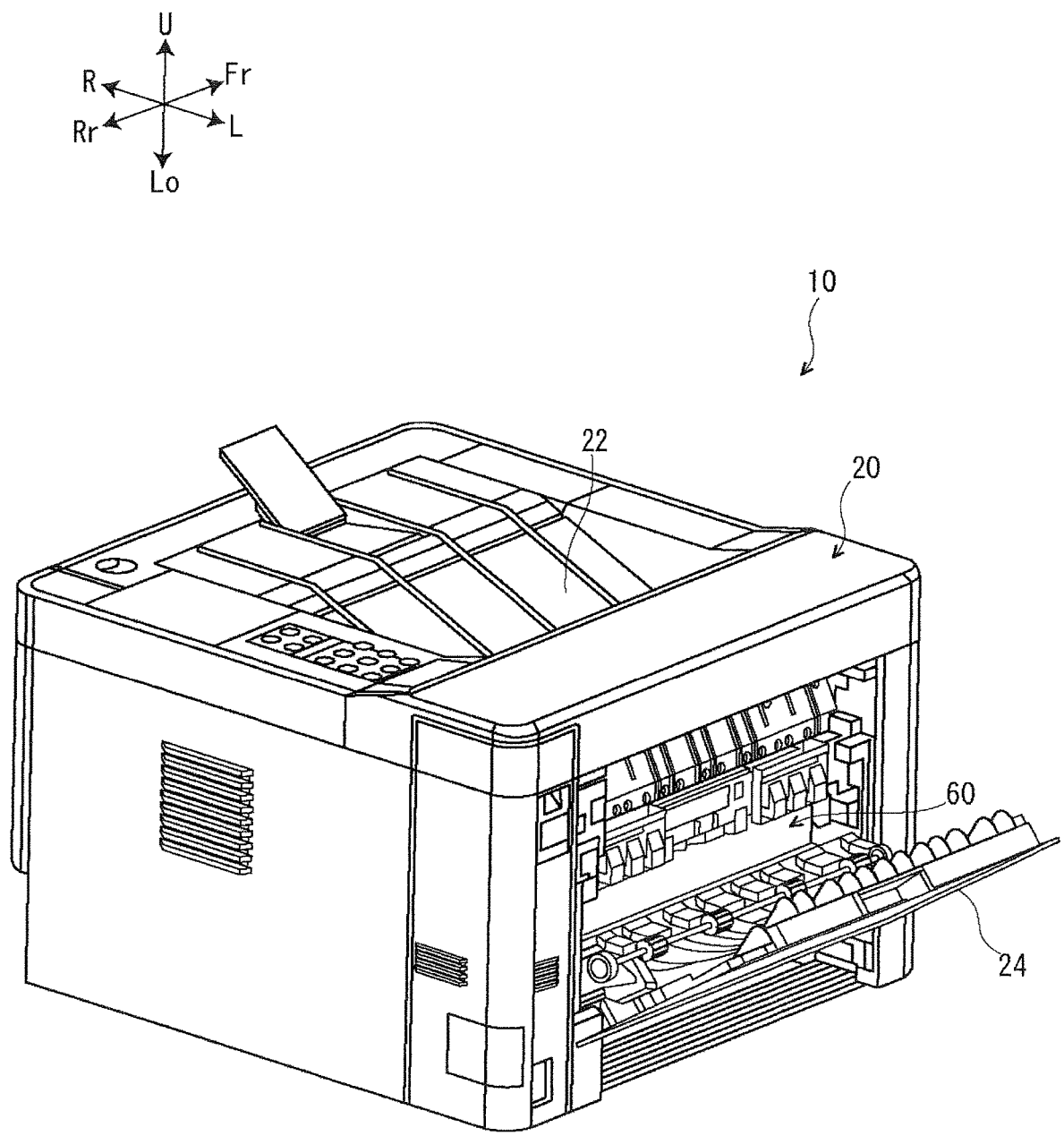
FIG. 1 obliquely illustrates an image forming apparatus having a configuration to execute the disclosure (hereinafter referred to as an embodiment)

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Outline

Figure 4:
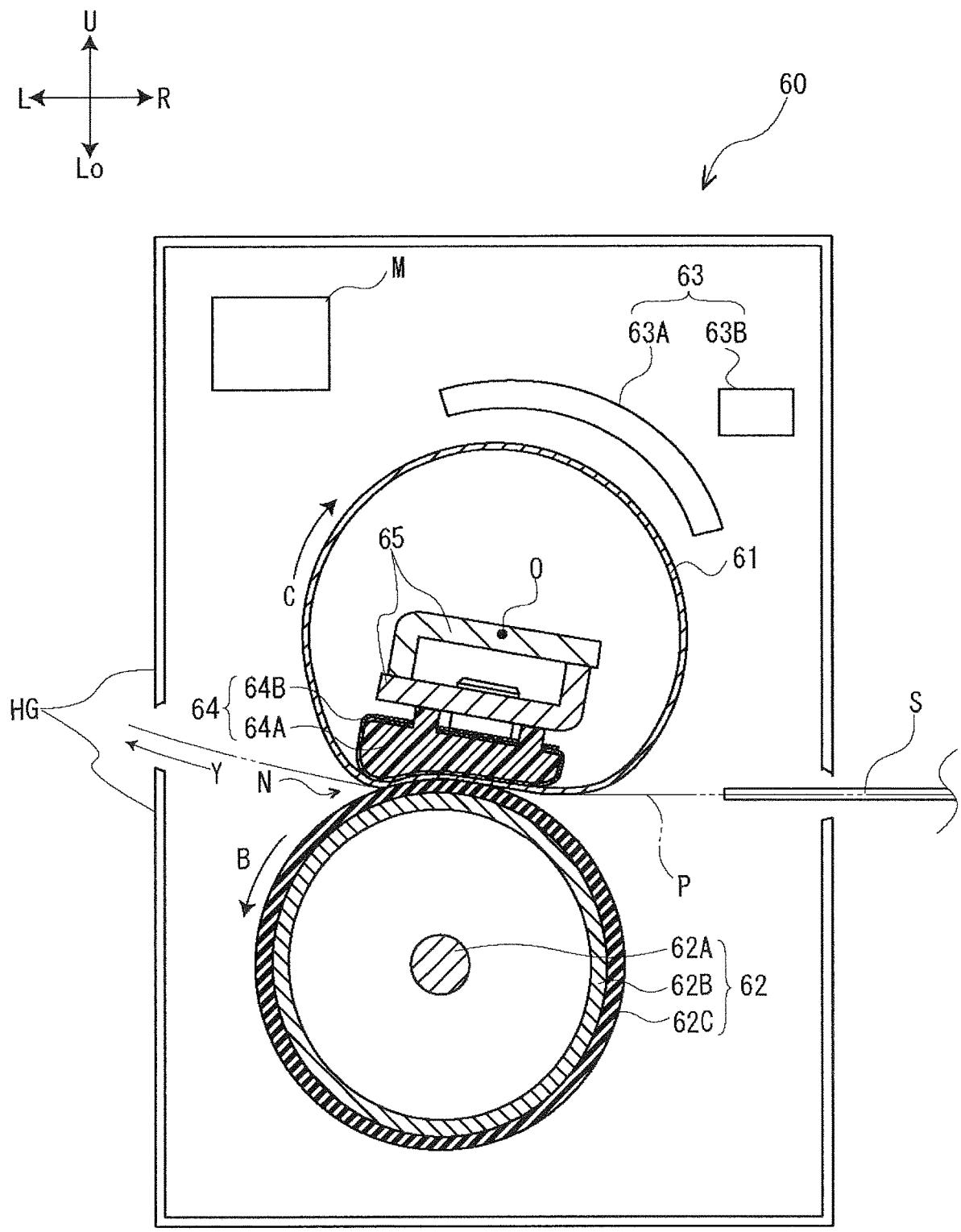
FIG. 4 illustrates a schematic diagram viewing a fixing device that constitutes the image forming apparatus according to the embodiment from a front side.

The following describes an overall constitution of an image forming apparatus 10 (see FIGS. 1 and 2) according to an embodiment, an image forming operation by the image forming apparatus 10, a constitution of a fixing device 60 (see FIG. 4, FIGS. 5A to 5D, and FIGS. 6A and 6B) that is a main part of the embodiment, a rotational operation of a pressure roller 62 (see FIG. 4) that constitutes the fixing device 60 according to the embodiment, and effects of the embodiment, in order of these description with reference to the drawings.

In the following description, in the drawings, assume that directions indicated by an arrow Fr and an arrow Rr are respectively a front side and a back side in an apparatus depth direction, the directions indicated by an arrow R and an arrow L are respectively the right side and the left side in an apparatus width direction, and the directions indicated by an arrow U and an arrow Lo are respectively an upper side and a lower side in an apparatus height direction. This description describes the image forming apparatus 10 by assuming that a state viewed from the front side in the apparatus depth direction is the front of the image forming apparatus 10.

Overall Constitution of Image Forming Apparatus

Figure 2:
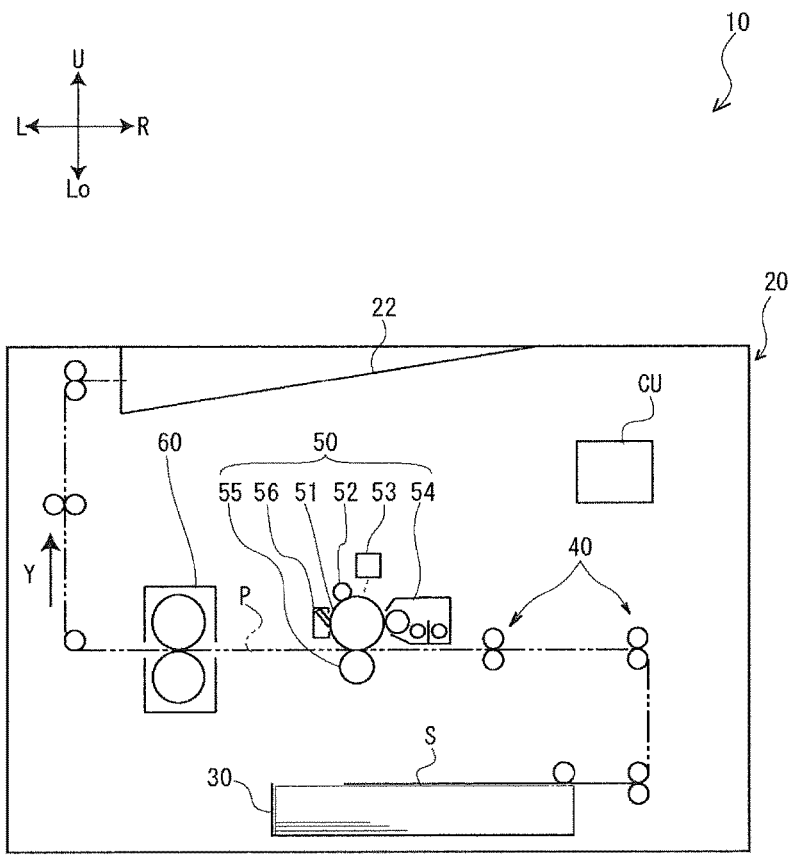
FIG. 2 illustrates a schematic diagram viewing the image forming apparatus according to the embodiment from a front side.

A description will be given of the overall constitution of the image forming apparatus 10 according to the embodiment with reference to FIGS. 1 and 2. The image forming apparatus 10 is an electrophotographic-method apparatus constituted including a main body 20, a sheet feed cassette 30, a conveyance apparatus 40, a toner image forming unit 50, the fixing device 60, and a control unit CU.

The main body 20 has a function to internally house the sheet feed cassette 30, the conveyance apparatus 40, the toner image forming unit 50 (an exemplary forming unit), the fixing device 60, and the control unit CU. The main body 20 is an exterior with a box shape. The top surface of the main body 20 includes a discharge tray 22 where a medium S with a toner image fixed (with an image formed) is discharged. A lid 24 (see FIG. 1) is located on the left end surface of the main body 20 viewed from the front side, and the fixing device 60 is removably attachable to the main body 20 in a state where the lid 24 is tilted (see FIG. 1).

The sheet feed cassette 30 has a function to house the medium S, where an image is to be formed (in later processes), in a stacked state. The sheet feed cassette 30 is arranged in the lower side of the main body 20.

The conveyance apparatus 40 has a function to convey the medium S housed in the sheet feed cassette 30 up to the discharge tray 22 from the sheet feed cassette 30 along a conveying path P. The conveyance apparatus 40 includes a plurality of rollers (driven rollers and drive rollers) and a driving source (not illustrated) driving the drive rollers. Here, a direction that an arrow Y points in FIG. 2 is a conveyance direction of the medium S.

The toner image forming unit 50 has a function to form a toner image to the medium S conveyed by the conveyance apparatus 40. The toner image forming unit 50 is arranged in the center inside the main body 20 viewed from the front side. The toner image forming unit 50 is constituted including a photoreceptor 51, a charging apparatus 52, an exposure apparatus 53, a developing device 54, a transfer roller 55, and a cleaning apparatus 56. The photoreceptor 51, the charging apparatus 52, the developing device 54, the transfer roller 55, and the cleaning apparatus 56 are each constituted to be long-sized and are each arranged in a state aligned in the apparatus depth direction.

The toner image forming unit 50 charges the photoreceptor 51 rotating around a shaft by the charging apparatus 52, exposes the photoreceptor 51 by the exposure apparatus 53 to form a latent image, develops the latent image by using toner with the developing device 54 to form a toner image, and transfers the toner image to the medium S by the transfer roller 55. As described above, the toner image forming unit 50 forms a toner image on the medium S. The cleaning apparatus 56 removes the toner attaching and remaining on the photoreceptor 51 without having been transferred to the medium S, from the photoreceptor 51.

The fixing device 60 has a function to fix the toner image to the medium S (the medium with the toner image formed) where the toner image is transferred by the toner image forming unit 50. The fixing device 60 is arranged on the left side (a downstream side in the conveyance direction of the medium S with respect to the toner image forming unit 50 in the conveying path P of the medium S) inside the main body 20 viewed from the front side.

The control unit CU has a function to control respective components that constitute the image forming apparatus 10. For example, the control unit CU receives image data from an external device (not illustrated) and controls the respective components that constitute the image forming apparatus 10 based on the image data (see FIG. 3). The specific functions of the control unit CU will be described in a description of the image forming operation described later.

Image Forming Operation

Next, a description will be given of the image forming operation of the image forming apparatus 10 according to the embodiment with reference to FIGS. 2 and 3.

First, the control unit CU that has received the image data from the external device (not illustrated) causes the toner image forming unit 50 to operate. Then, charging the photoreceptor 51 by the charging apparatus 52, exposing the photoreceptor 51 by the exposure apparatus 53 to form the latent image, and developing the latent image by the developing device 54 to form the toner image causes the toner image to be formed on the photoreceptor 51.

The control unit CU operates the conveyance apparatus 40 and sends the medium S into a transfer position, in accordance with timing where the toner image formed on the photoreceptor 51 reaches the transfer position (a position where the photoreceptor 51 and the transfer roller 55 mutually contact) by rotation of the photoreceptor 51 around the shaft. Then, the transfer roller 55 transfers the toner image formed on the photoreceptor 51 to the medium S, and the toner image is formed on the medium S.

Subsequently, the control unit CU operates the fixing device 60 and fixes the toner image transferred on the medium S to the medium S. Then, the medium S where the toner image is fixed, namely, the medium S where the image is formed is further conveyed to the downstream side in the conveyance direction by the conveyance apparatus 40 and is discharged in the discharge tray 22 of the main body 20. This terminates the image forming operation.

Constitution of Main Part (Fixing Device)

Next, a description will be given of the constitution of the fixing device 60, which is a main part of the embodiment, in detail by referring to FIG. 4, FIGS. 5A to 5D, and FIGS. 6A and 6B.

The fixing device 60 is constituted including a heating belt 61 (an exemplary driven body), the pressure roller 62 (an exemplary rotator), a heat source 63, a pressing unit 64, a supporting member 65, a housing HG, a pair of side plates (not illustrated), a driving source M, and a driving unit 66. The heating belt 61, the pressure roller 62, the heat source 63, and the pressing unit 64 are each constituted to be long-sized, and are positioned to the pair of side plates, in a state where those longitudinal directions are aligned (with the apparatus depth direction) with one another. Then, the fixing device 60 is constituted to be long-sized and is mounted to the main body 20 of the image forming apparatus 10, in a state where its longitudinal direction is aligned with the apparatus depth direction (see FIG. 1). The components other than the housing HG and the driving source M, which constitute the fixing device 60, are housed inside the housing HG.

Heating Belt

The heating belt 61 has a function to heat the toner image (the toner that constitutes the toner image), which is formed on the medium S by the toner image forming unit 50, and the medium S. The heating belt 61 is, as one example, an endless belt made of metal. The heating belt 61 rotates by being driven by the pressure roller 62, which will be described later, while being heated by the heat source 63, which will be described later. Here, the sign O in FIG. 4 indicates a rotational center of the heating belt 61, and an arrow C indicates a rotation direction (a circumferential direction) of the heating belt 61. Then, the heating belt 61 applies pressure to the medium S, where the toner image has been formed and which is conveyed by the conveyance apparatus 40, with the pressure roller 62 at a nip N, which will be described later. Consequently, the heating belt 61 contacts the medium S where the toner image has been formed to heat the medium S while rotating around the shaft, and fixes the toner image to the medium S, which passes through the nip N, with the pressure roller 62.

Flanges (not illustrated) are fitted into portions at both ends of the heating belt 61, and the heating belt 61 is adhered and secured to each flange. Then, each flange is rotatably supported by a pair of side plates.

Pressure Roller

The pressure roller 62 has a function to apply pressure to the toner image formed on the medium S by the toner image forming unit 50 and the medium S with the heating belt 61. The pressure roller 62 is a roller constituted including a long-sized shaft 62A, a long-sized pipe 62B, and a rubber layer 62C that covers the outer periphery of the pipe 62B. The pressure roller 62 is arranged on the lower side of the heating belt 61 viewed from the apparatus depth direction. The lower-side portion of the heating belt 61 in a state depressed along the outer periphery of the pressure roller 62 is in contact with the upper-side portion of the pressure roller 62. Here, the nip N described above means a contact portion, which is formed by the pressure roller 62 and the heating belt 61, of the pressure roller 62 and the heating belt 61.

One end of the shaft 62A of the pressure roller 62 is connected to the driving unit 66 (see FIGS. 5A to 5D and FIGS. 6A and 6B), which will be described later. Then, the pressure roller 62 is driven by the driving source M (the driving unit 66 where torque is transmitted from the driving source M) to rotate around the shaft, and causes the heating belt 61 to be driven. Here, an arrow B in FIG. 4 indicates the rotation direction of the pressure roller 62.

Heat Source

The heat source 63 has a function to add heat for the heating belt 61 to heat the medium S to the heating belt 61. The heat source 63 is constituted including, as one example, an induction coil 63A and an AC power supply 63B. The induction coil 63A is arranged above the heating belt 61 opposing to the outer periphery of the heating belt 61, and is arc-shaped viewed from the front side in the apparatus depth direction. Then, applying the AC voltage to the induction coil 63A from the AC power supply 63B heats the heating belt 61 by electromagnetic induction.

Pressing Unit

The pressing unit 64 has a function to press the portion that forms the nip N in the heating belt 61 to the pressure roller 62. The pressing unit 64 is arranged inside the heating belt 61 and on the lower side with respect to an axis O, viewed from the apparatus depth direction. The pressing unit 64 is constituted including a pressing member 64A and a sheet member 64B. The pressing member 64A has the lower side depressed in a curved shape, viewed from the apparatus depth direction. The depressed portion in a curved shape in the pressing member 64A is covered by the sheet member 64B.

Supporting Member

The supporting member 65 has a function to support the pressing member 64A. The supporting member 65 is constituted to be long-sized. The supporting member 65 is constituted to have a lateral cross-section with a rectangular shape by a pair of long-sized, L-shaped sheet metals being alternately opposed. The supporting member 65 is arranged on the upper side of the pressing member 64A (pressing unit 64) viewed from the apparatus depth direction.

Driving Unit

The driving unit 66 has a function to receive torque from the driving source M to rotate the pressure roller 62 (the shaft 62A of the pressure roller 62) around the shaft with the torque. The driving unit 66, as illustrated in FIGS. 5A to 5D and FIGS. 6A and 6B, is constituted including a holder 70, a gear train 72, a pressure-roller gear 74, and a one-way clutch 76 (hereinafter referred to as an OWC 76). Of the pair of side plates (not illustrated), the driving unit 66 is mounted to an outside surface of the side plate on the back side in the apparatus depth direction.

Holder

The holder 70 has a function to hold components constituting the driving unit 66 other than the holder 70. As illustrated in FIGS. 5A to 5D and FIGS. 8A and 8B, the holder 70 is constituted of a first sheet metal 70A and a second sheet metal 70B. The holder 70 is mounted to the side plate as follows: the first sheet metal 70A is screwed to the outside surface of the side plate; and the second sheet metal 70B is screwed to the first sheet metal 70A in a state where the second sheet metal 70B and the first sheet metal 70A sandwich the gear train 72, the gear 74 and the OWC 76.

Gear Train

Figure 5A:
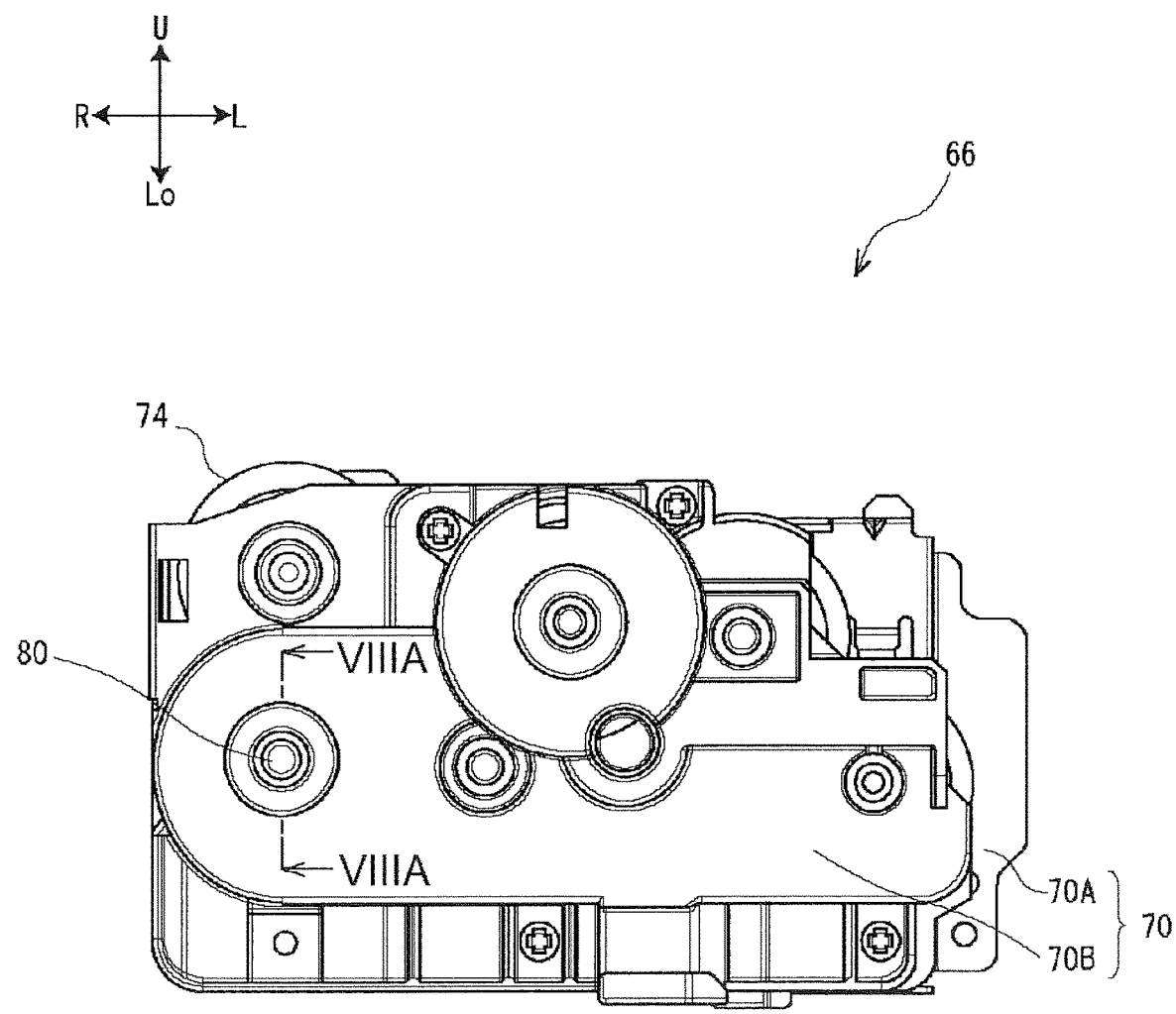
FIG. 5A illustrates a front view of a driving unit that constitutes the fixing device according to the embodiment.
Figure 5B:
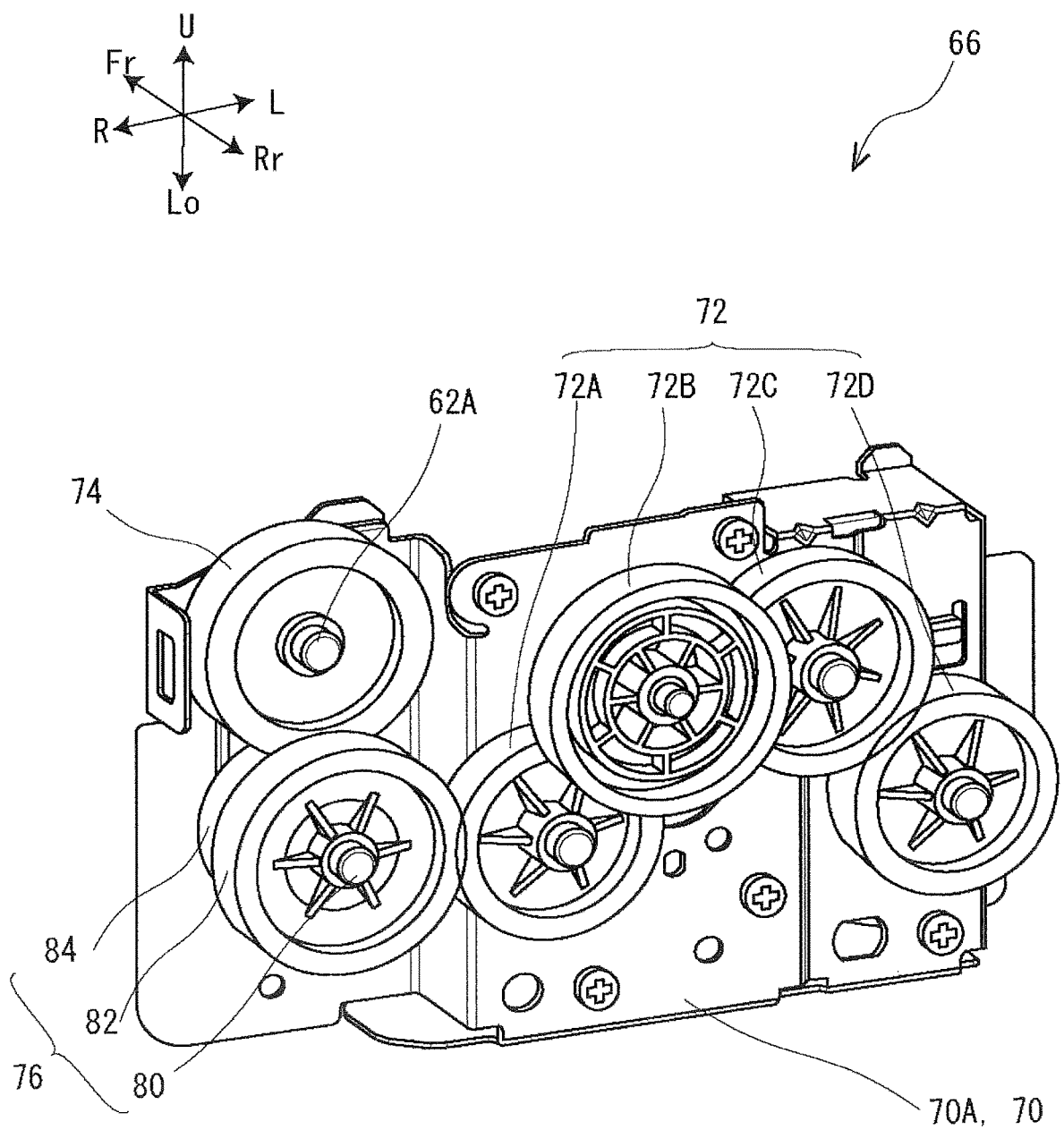
FIG. 5B obliquely illustrates the driving unit according to the embodiment.
Figure 5C:
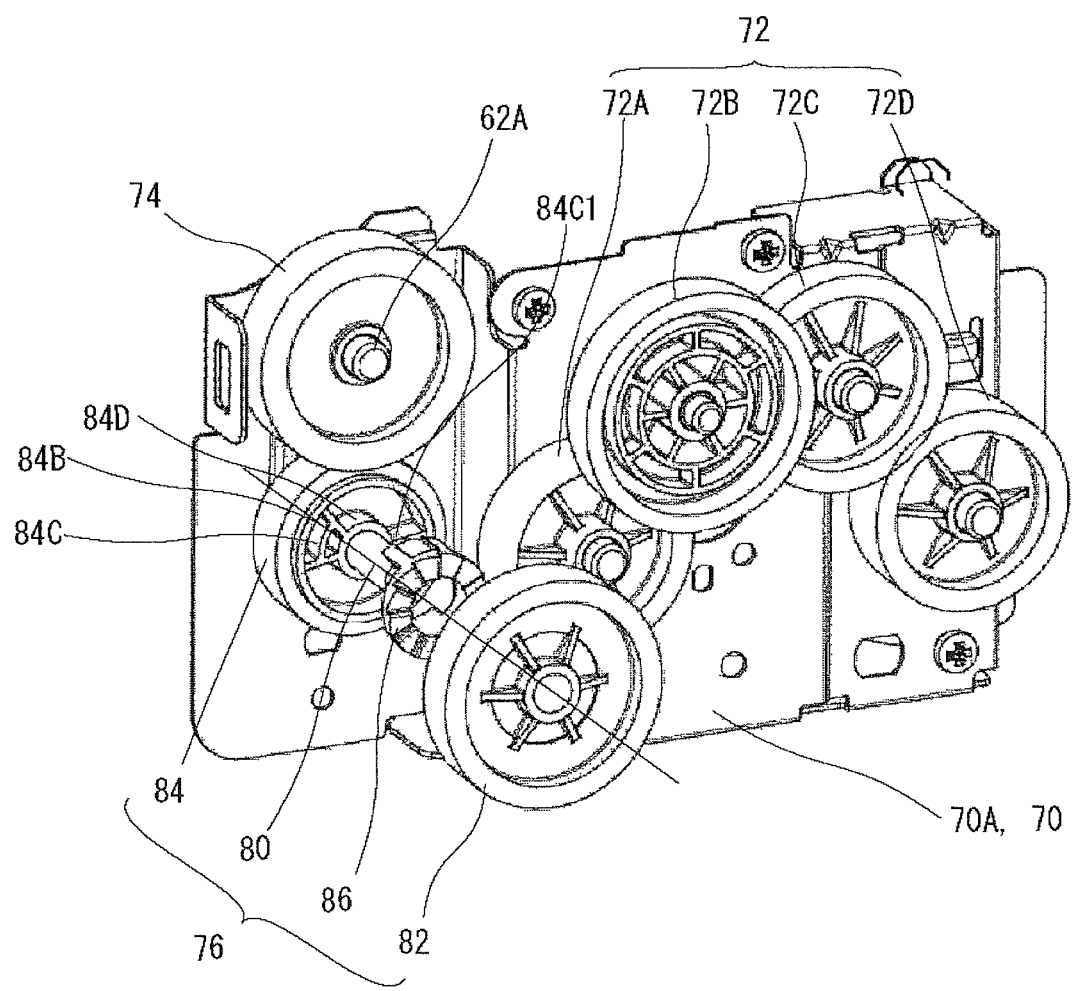
FIG. 5C illustrates an exploded perspective view of the driving unit according to the embodiment.
Figure 5D:
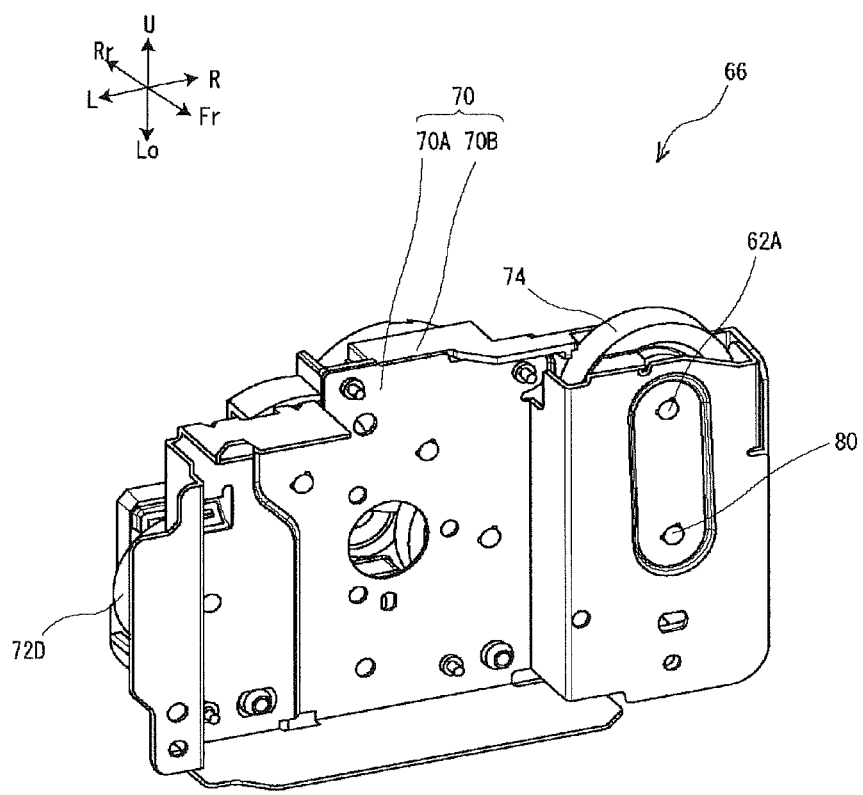
FIG. 5D illustrates a back view of the driving unit that constitutes the fixing device according to the embodiment.

The gear train 72 has a function to transmit the torque from the driving source M to the OWC 76, which will be described later, and rotating members (not illustrated) other than the OWC 76. As illustrated in FIGS. 5B and 5C, the gear train 72 includes gears 72A, 72B, 72C, and 72D. The gears 72A, 72B, 72C, and 72D are, as one example, spur gears. The gears 72A, 72B, 72C, and 72D are engaged in line in order of these descriptions. In this embodiment, as one example, the rotation shaft of the gear 72A is connected to the driving source M, and the gear 72A engages with an input gear 82 of the OWC 76, which will be described later. The gear 72D is connected to the above-described rotating members as one example.

Pressure-Roller Gear

The pressure-roller gear 74 (hereinafter referred to as the gear 74) has a function to engage with an output gear 84 of the OWC 76, which will be described later, and to rotate around the shaft with the torque transmitted from the output gear 84. The gear 74 secures a portion on one end side of the shaft 62A of the pressure roller 62 at its center, and thus has a function to rotate the shaft 62A (pressure roller 62) in association with its own rotation around the shaft.

OWC

When torque in a determined direction is transmitted from the driving source M, the OWC 76 has a function to transmit the torque to the gear 74 (rotate the gear 74). The OWC 76 does not rotate the gear 74 even when a torque in a direction opposite to the provisionally determined direction is transmitted. That is, the OWC 76 is, as its name, what is called, a one-way clutch. As illustrated in FIGS. 5B and 5C, FIGS. 6A and 6B, and FIGS. 8A and 8B, the OWC 76 is constituted including a support shaft 80, the input gear 82 (an exemplary first gear), the output gear 84 (an exemplary second gear), a transmission unit 86, and a coil spring 88 (an exemplary stretchable member).

Support Shaft

The support shaft 80 has a function to rotatably support the input gear 82, the transmission unit 86, and the output gear 84 on its outer periphery in order of these description. The portions on both ends side of the support shaft 80 are fitted into through-holes each formed in the first sheet metal 70A and the second sheet metal 70B of the holder 70 to be secured. The support shaft 80 supports the input gear 82, the transmission unit 86, and the output gear 84 such that the output gear 84 is located on the first sheet metal 70A side and the input gear 82 is located on the second sheet metal 70B side. The support shaft 80 supports in a state where the coil spring 88 is compressed between the first sheet metal 70A and the output gear 84 (see FIGS. 8A and 8B).

Input Gear

The input gear 82, as described above, has a function to rotate around the shaft with the torque transmitted from the gear 72A, in engaging with the gear 72A of the gear train 72 (see FIG. 5B). One surface 82A (a surface facing the output gear 84 side, see FIG. 6B) in an axial direction of the input gear 82 includes a saw-teeth portion 82B (an exemplary first ratchet portion) into which a saw-teeth portion 86A (see FIGS. 6A and 6B) of the transmission unit 86, which will be described later, fits. The saw-teeth portion 82B has a pattern of solids projecting from the surface 82A to circle around the whole circumference around the shaft when viewed from the axial direction of the input gear 82. Each tooth that constitutes the saw-teeth portion 82B has a surface 82C perpendicular to a (forward) rotation direction (a direction of the arrow in FIG. 6B) for transmitting the torque from the gear train 72 and an inclined surface 82D connecting the surfaces 82C adjacent in the circumferential direction, respectively. The input gear 82 is, as one example, a spur gear made of resin.

Output Gear

Figure 6A:
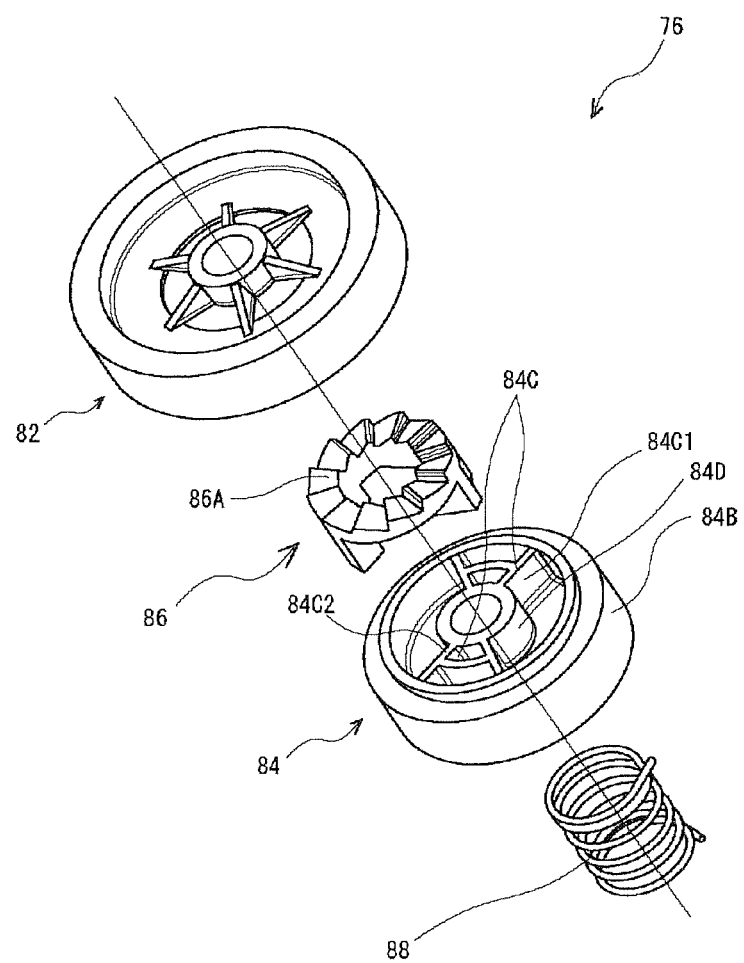
FIG. 6A illustrates an exploded perspective view of a one-way clutch that constitutes the driving unit according to the embodiment.
Figure 6B:
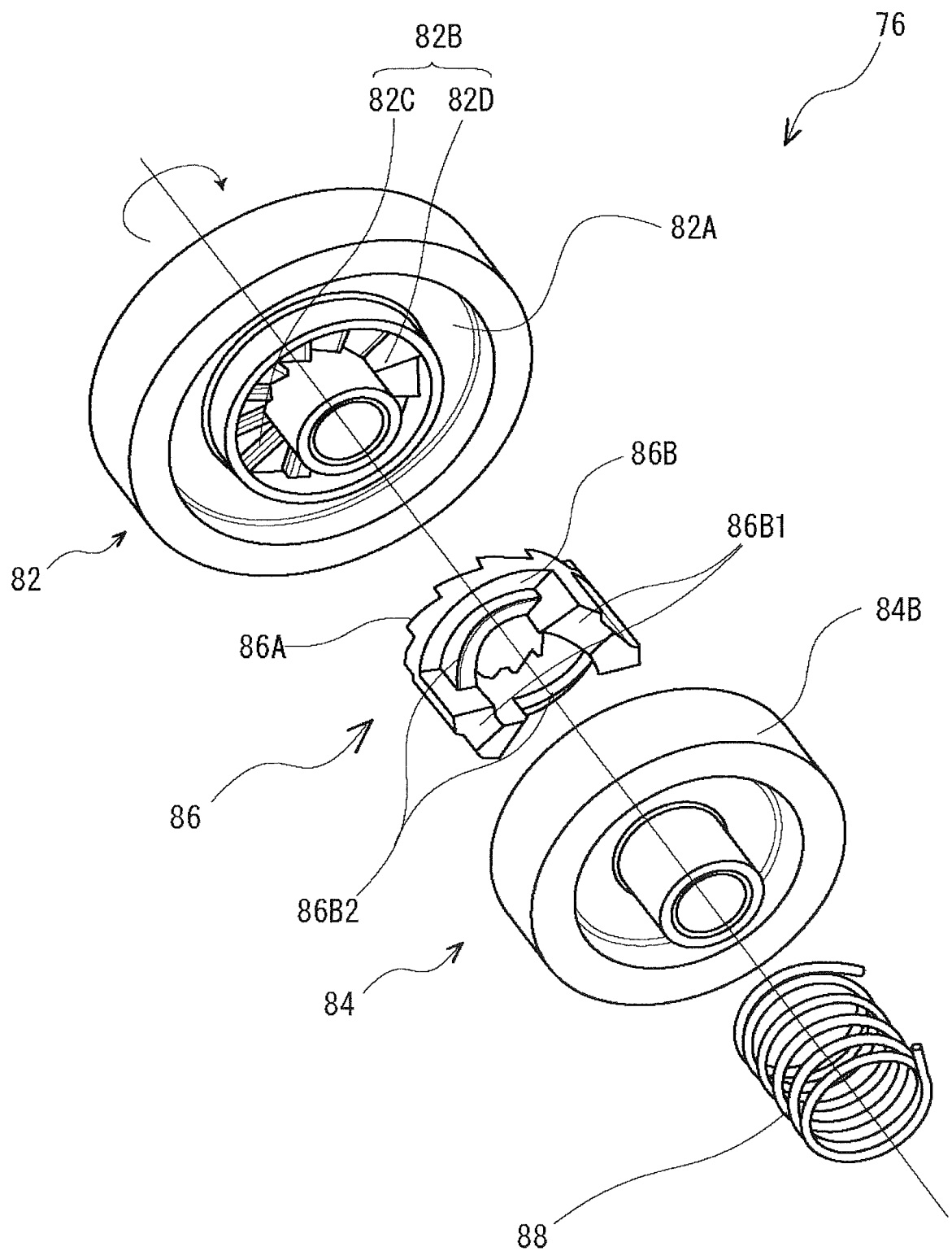
FIG. 6B illustrates the one-way clutch that constitutes the driving unit according to the embodiment and illustrates an exploded perspective view viewed from a direction different from the exploded perspective view in FIG. 6A.

As described above, the output gear 84 has a function to rotate around the shaft by the torque transmitted from the input gear 82 via the transmission unit 86, which will be described later, in engaging with the gear 74 (see FIGS. 5B and 5C). Consequently, the output gear 84 rotate the gear 74 (and the shaft 62A and the pressure roller 62 that are secured to the gear 74) around the shaft by rotating around the shaft. As illustrated in FIG. 5C and FIGS. 6A and 6B, a shaft portion 84D of the output gear 84 is coaxially arranged with the shaft of the input gear 82. As illustrated in FIG. 6A, the output gear 84 is constituted of the shaft portion 84D covering the support shaft 80, an outer portion 84B where spur teeth are formed over the whole circumference of the outer periphery, and a connection wall 84C connecting the shaft portion 84D to the outer portion 84B (an exemplary outer peripheral portion). Then, the connection wall 84C is a pair of walls extending in a radial direction, and a surface 84C1 extending in the axial direction is formed to each connection wall 84C. That is, the surface 84C1 of each connection wall 84C is a surface facing in the circumferential direction. The output gear 84 is, as one example, a spur gear made of resin.

Transmission Unit

The transmission unit 86 has a function to transmit the torque of the input gear 82 to the output gear 84 by rotating forward (rotating in the direction of the arrow in FIG. 6B) around the shaft. As described above, the transmission unit 86 is arranged between the input gear 82 and the output gear 84 (see FIG. 5C, FIGS. 6A and 6B, and FIGS. 8A and 8B). The transmission unit 86 is a disk-shaped member with a through-hole formed in the center. The transmission unit 86 is, as one example, made of resin.

Here, as illustrated in FIGS. 6A and 6B, on the input gear 82 side in the transmission unit 86, the saw-teeth portion 86A (an exemplary second ratchet portion) where the saw-teeth portion 82B of the input gear 82 fits is formed.

As illustrated in FIGS. 6A and 6B, a pair of protrusions 86B1 (an exemplary contact portion) is formed on the output gear 84 side (a surface 86B) in the transmission unit 86. The pair of protrusions 86B1 is symmetric (point symmetry) with respect to the shaft (a shaft axis) viewed from the axial direction and is curved over the circumferential direction. The pair of protrusions 86B1 projects to the output gear 84 side and gets into the portion between the one connection wall 84C and the other connection wall 84C in the circumferential direction of the output gear 84 (not illustrated). In this embodiment, each protrusion 86B1 has the width in the circumferential direction shorter than a separation width between the one connection wall 84C and the other connection wall 84C in the circumferential direction of the output gear 84. As described above, rotation of the transmission unit 86 around the shaft causes the pair of protrusions 86B1 (the side surface in the circumferential direction of the pair of protrusions 86B1) abuts on the connection wall 84C (the surface 84C1 of the connection wall 84C) of the output gear 84.

As illustrated in FIG. 6B, a pair of inclined walls 86B2 is formed in the portion (that is the portion between the pair of protrusions 86B1 in the circumferential direction) other than the portion where the pair of protrusions 86B1 is formed in the surface 86B on the output gear 84 side. The pair of inclined walls 86B2 is inclined such that the projection amount (meaning a height projecting from the surface 86B to the output gear 84 side, in the axial direction) continuously decreases over the downstream side from the upstream side in the direction of the forward rotation (the direction of the arrow in FIG. 6B) of the transmission unit 86. As described above, the forward rotation of the transmission unit 86 around the shaft causes the transmission unit 86 to move to the input gear 82 side in the axial direction while the pair of inclined walls 86B2 is pressed by the connection wall 84C (a surface 84O2 facing the transmission unit 86 side in the connection wall 84C) of the output gear 84 and then causes the saw-teeth portion 86A to fit into the saw-teeth portion 82B of the input gear 82.

Coil Spring

Figure 8A:
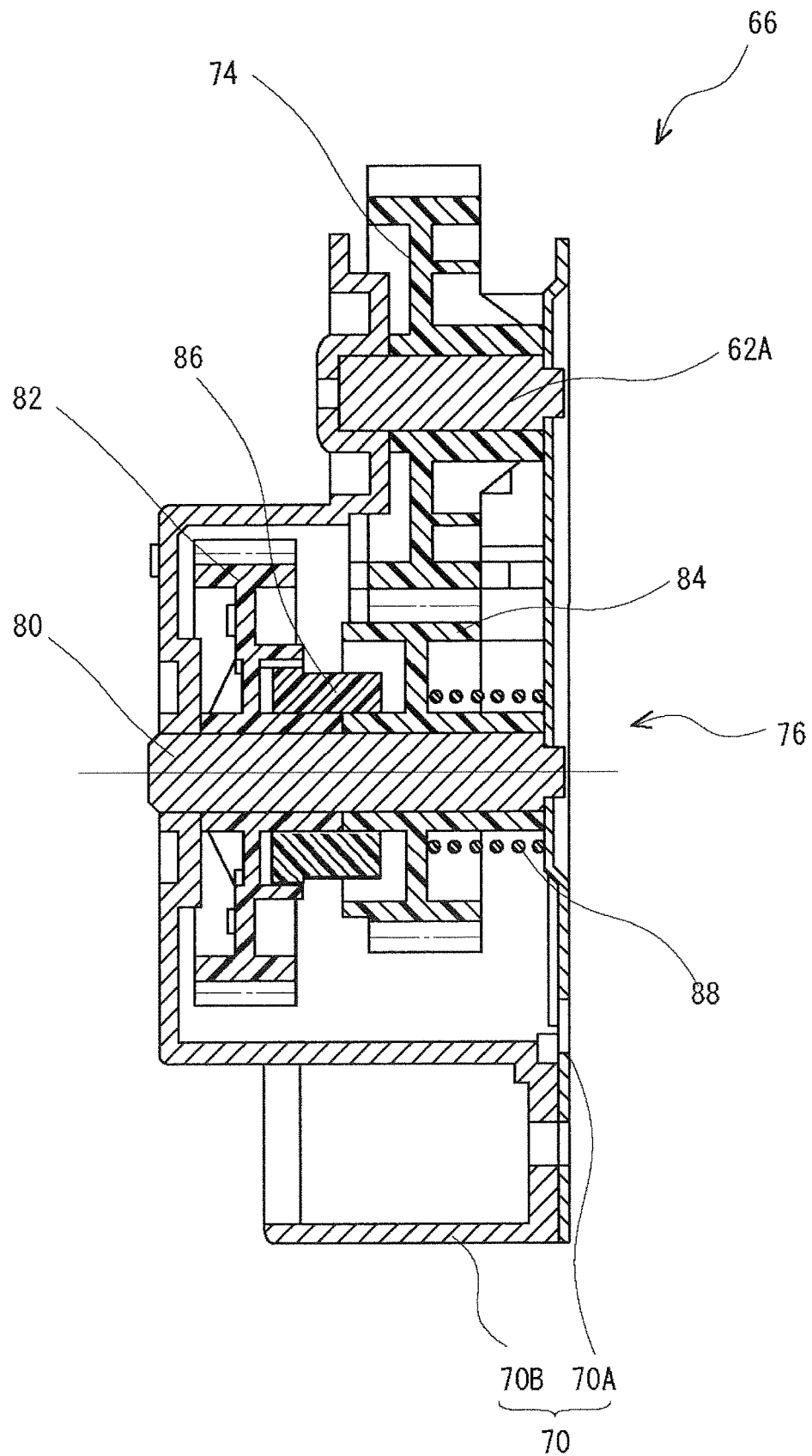
FIG. 8A illustrates a cross-sectional view of the driving unit taken along the line VIIIA-VIIIA in FIG. 5A and illustrates a partial cross-sectional view indicating a state where a transmission unit is connected to a first gear.
Figure 8B:
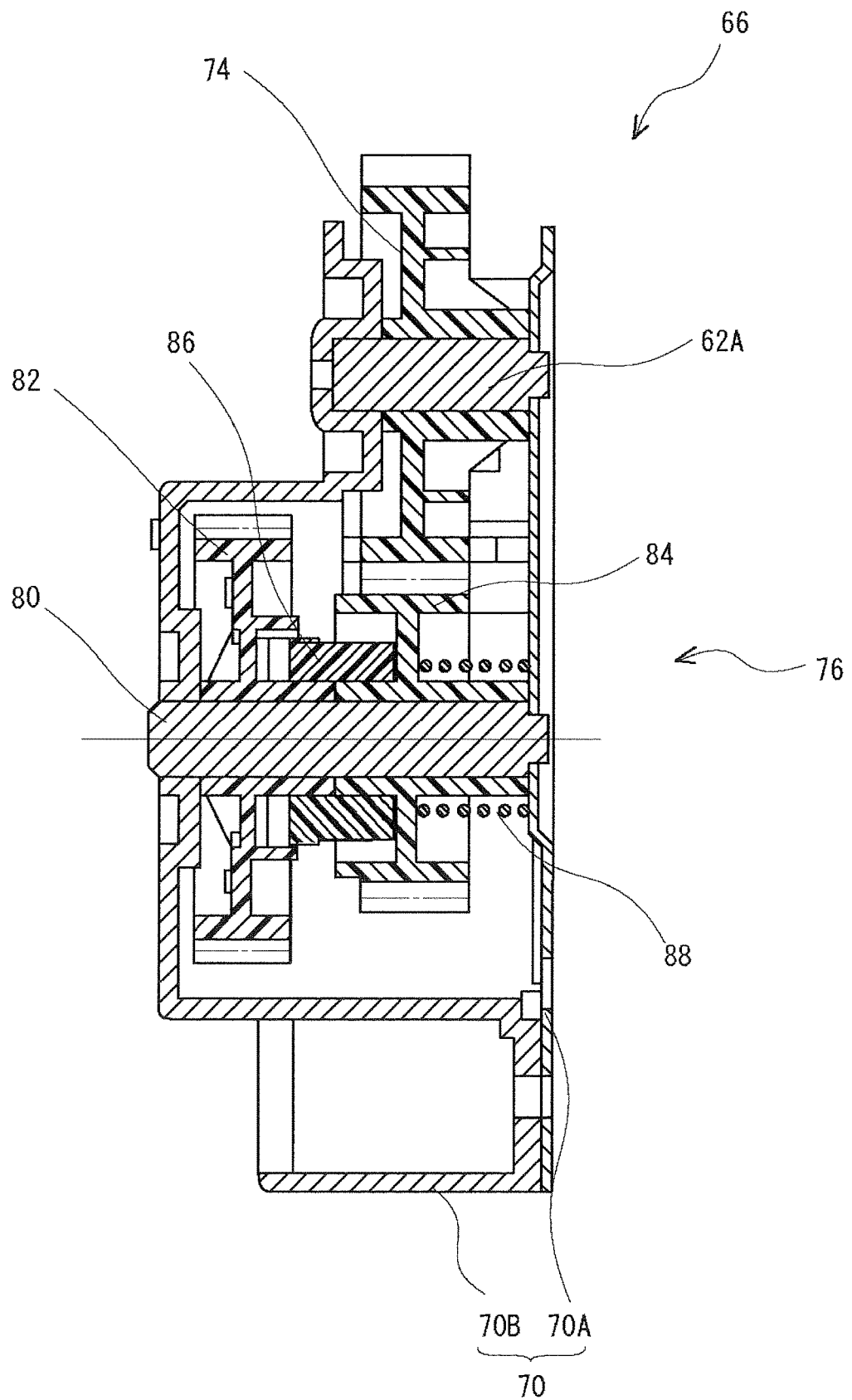
FIG. 8B illustrates a cross-sectional view of the driving unit taken along the line VIIIA-VIIIA in FIG. 5A and illustrates a partial cross-sectional view indicating a state where the transmission unit is not connected to the first gear.
Figure 9A:
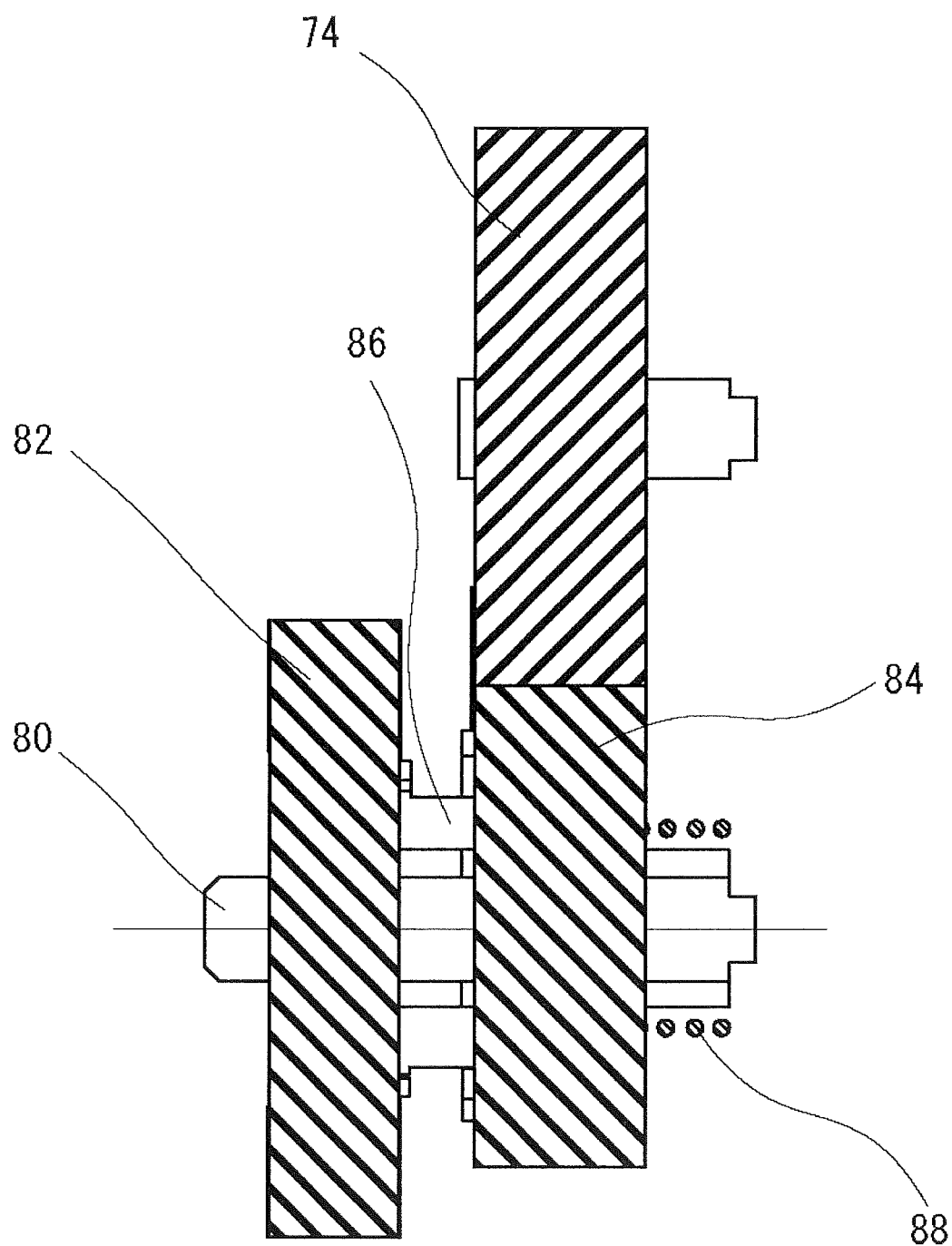
FIG. 9A illustrates a schematic diagram of a one-way clutch according to a first modification.
Figure 9B:
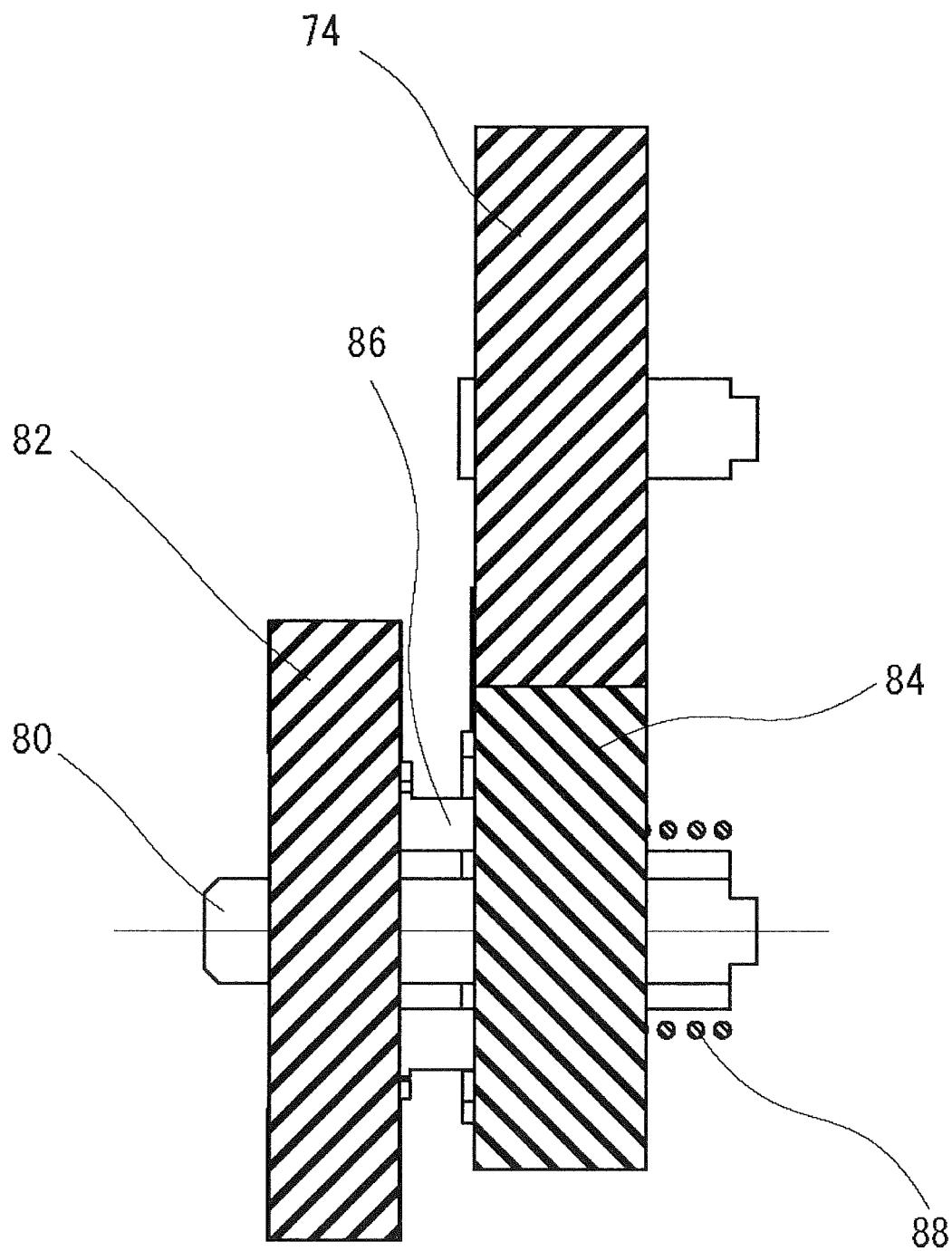
FIG. 9B illustrates a schematic diagram of a one-way clutch according to a second modification.
Figure 9C:
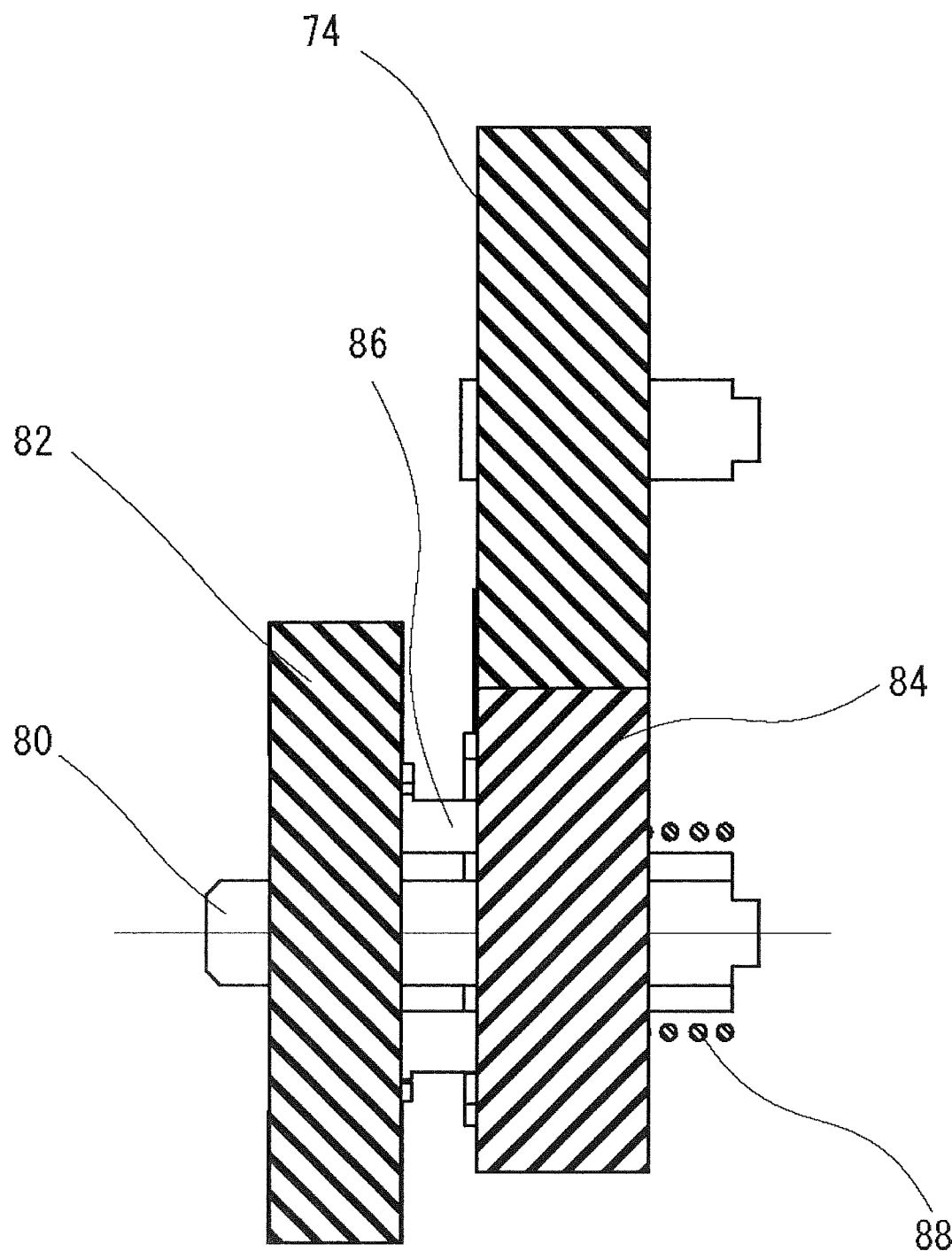
FIG. 9C illustrates a schematic diagram of a one-way clutch according to a third modification.
Figure 9D:
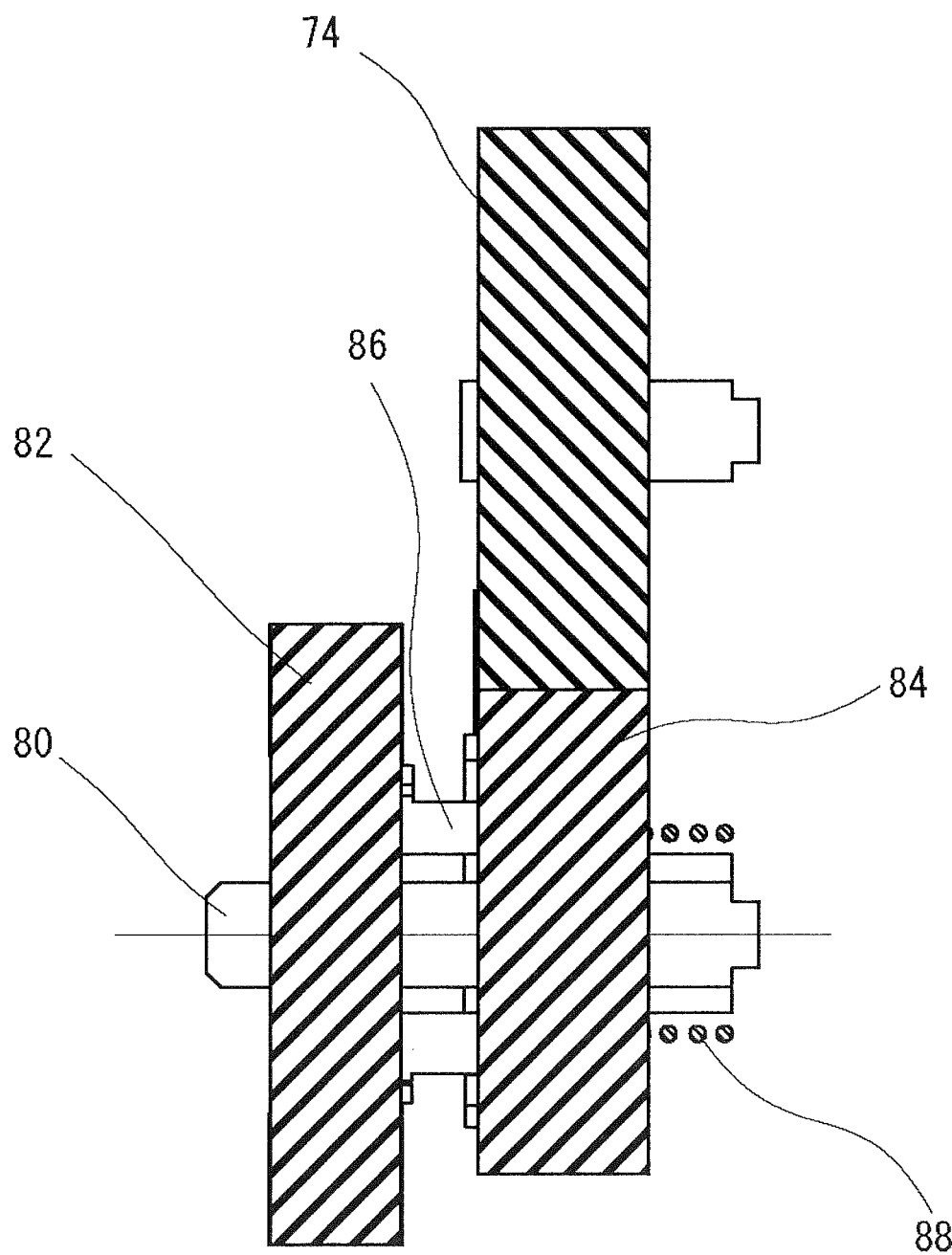
FIG. 9D illustrates a schematic diagram of a one-way clutch according to a fourth modification.

The coil spring 88 has a function to press the surface 84C2 on the transmission unit 86 side of the output gear 84 to the transmission unit 86 (the pair of the inclined walls 86B2 of the transmission unit 86) as illustrated in FIGS. 8A and 8B. The coil spring 88, as described above, is arranged on the opposite side of the transmission unit 86 by sandwiching the output gear 84 in the axial direction (see FIGS. 6A and 6B). As described above, the coil spring 88 is constantly in a compressed state (namely, in a shrunk state) between the first sheet metal 70A and the output gear 84. That is, in the forward rotation around the shaft, the coil spring 88 press the output gear 84 (the surface 84C2 of the output gear 84) to the transmission unit 86 (the inclined wall 86B2 of the transmission unit 86) so as to apply a load torque to the input gear 82 and the output gear 84 constantly.

In this embodiment, the coil spring 88 in the compressed state presses the surface 8402 of the output gear 84 to the inclined wall 86B2 (the surface opposing the surface 8402 of the inclined wall 86B2) of the transmission unit 86 with, as one example, an pressing force F that satisfies the following Formula 1.

$$F \geq F1 \times \tan X. \qquad \text{Formula 1:}$$

Figure 7:
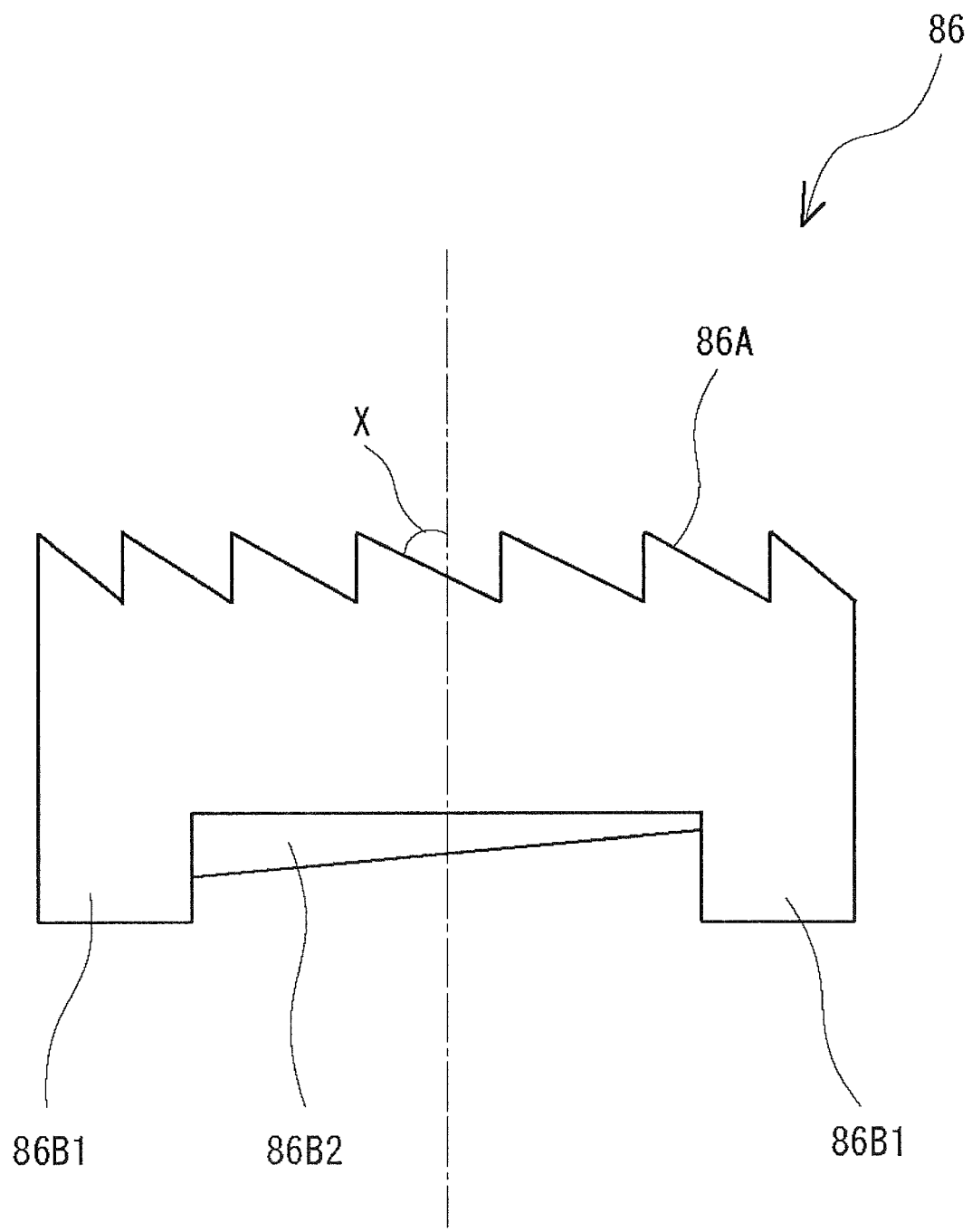
FIG. 7 illustrates a schematic diagram for describing an inclination angle X according to the embodiment.

Here, F1 is a force that the saw-teeth portion 86A receives from the saw-teeth portion 82B in the axial direction when the transmission unit 86 rotates forward. X is an inclination angle of the inclined surface of the saw-teeth portion 86A relative to the axial direction (see FIG. 7).

Rotational Operation of Pressure Roller

Next, a description will be given of rotational operations of the pressure roller 62 according to the embodiment by referring to the drawings.

Figure 3:
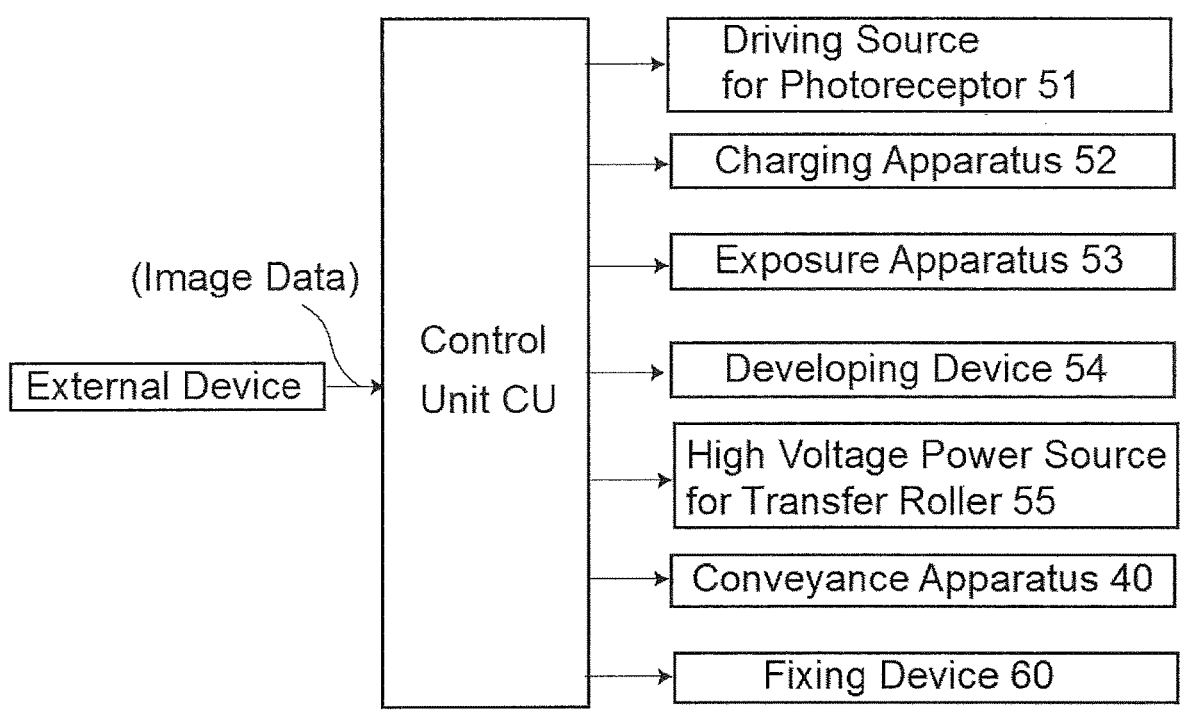
FIG. 3 illustrates a block diagram indicating a relationship between a control unit constituting the image forming apparatus according to the embodiment and each component constituting the image forming apparatus.

When receiving image data from an external device (not illustrated), the control unit CU operates the fixing device 60 (see FIG. 3). Then, the control unit CU causes the driving source M (see FIG. 4) to drive.

Subsequently, in association with the driving of the driving source M, the gear 72A of the gear train 72 (see FIGS. 5B and 5C) is rotationally driven around the shaft. In association with this, the input gear 82 (see FIGS. 5B and 8A) engaging with the gear 72A is rotated forward around the shaft.

Subsequently, in association with the forward rotation of the input gear 82, the saw-teeth portion 82B of the input gear 82, by being pressed by the coil spring 88, rotates forward around the shaft while sliding on the saw-teeth portion 86A of the transmission unit 86 that is pressed by the saw-teeth portion 82B and then fits into the saw-teeth portion 86A (see FIG. 8A). Then, in association with the rotation of the input gear 82 around the shaft, the transmission unit 86 rotates around the shaft (the torque is transmitted to the transmission unit 86 from the input gear 82). During a period until the saw-teeth portion 82B fits into the saw-teeth portion 86A after the input gear 82 starts rotation, the transmission unit 86 moves to the input gear 82 side in the axial direction (which becomes the state in FIG. 8A from the state in FIG. 8B) while the surface 84C2 of the output gear 84 pressed by the coil spring 88 is pressed against the inclined wall 86B2. During a period until the saw-teeth portion 82B fits into the saw-teeth portion 86A after the input gear 82 starts rotation, the coil spring 88 is continuously compressed. That is, during a period until fitting into the input gear 82 after the input gear 82 starts rotation, the transmission unit 86 is pressed to the input gear 82 by a gradually increasing force.

Next, rotation of the pair of protrusions 86B1 of the transmission unit 86 around the shaft in association with the rotation of the transmission unit 86 around the shaft causes the pair of protrusions 86B1 to contact with the pair of connection walls 84C of the output gear 84. Then, the output gear 84 rotates forward around the shaft (the torque is transmitted to the output gear 84 from the transmission unit 86) by being pressed by the transmission unit 86.

Next, in association with the rotation of the output gear 84 around the shaft, the gear 74 engaging with the output gear 84 (see FIGS. 5B and 5C) is rotationally driven around the shaft. Consequently, in association with the rotation of the gear 74, the shaft 62A (pressure roller 62) rotates around the shaft and terminates the rotational operation in forward rotation of the pressure roller 62.

When the fixing device 60 halts for a reason such as, what is called, a paper jam, and a user removes a medium S remaining in the nip N (see FIG. 4) of the fixing device 60, pulling the medium S by the user in a direction opposite to the conveyance direction (the direction of the arrow Y in FIG. 4) of the medium S causes the pressure roller 62 to be in a non-connected state (a state where the transmission unit 86 reversely rotates with the input gear 82 halted) to the OWC 76. Thus, the user easily (with moderate load) removes the medium S, and the rotational operation in the reverse rotation of the pressure roller 62 terminates.

Effect

Next, a description will be given of the effects according to the embodiment by referring to the drawings.

First Effect

For example, when the coil spring 88 in the OWC 76 is changed to a protrusion that is not stretchable in the axial direction, the saw-teeth portion 86A of the transmission unit 86 sometimes escapes to the output gear 84 side before fitting into the saw-teeth portion 82B of the input gear 82, and thus a ratchet skip sometimes occurs. This is caused by, for example, component tolerances of the input gear 82, the output gear 84, the transmission unit 86 or similar component. The larger the load is and the larger the torque is, the more significantly the ratchet skip occurs.

In contrast to this, in the embodiment, the transmission unit 86 is constantly pressed to the input gear 82 by the coil spring 88 in the compressed state (see FIGS. 8A and 8B). Consequently, in association with the rotation of the input gear 82, during a period until the saw-teeth portion 82B of the input gear 82 slides the saw-teeth portion 86A of the transmission unit 86 and then the saw-teeth portion 82B fits into the saw-teeth portion 86A, the transmission unit 86 cannot escape (or difficult to escape) to the output gear 84 side.

Therefore, a ratchet skip hardly occurs in the OWC 76 according to the embodiment. In particular, as the embodiment, when an output destination of the OWC 76 is like the pressure roller 62 that causes the heating belt 61 to be driven, namely, transmits a high torque, the effect described above become remarkable. As the embodiment, when the components (the input gear 82, the output gear 84, and the transmission unit 86) constituting the OWC 76 are made of resin, the effect described above become remarkable. In association with the above description, the fixing device 60 including the OWC 76 according to the embodiment hardly generates a fixing failure due to a ratchet skip. The image forming apparatus 10 including the fixing device 60 according to the embodiment hardly generates an image formation failure due to the fixing failure described above.

This effect is, from another perspective, also the effect that the coil spring 88 presses the output gear 84 (the surface 84C2 of the output gear 84) to the transmission unit 86 (the inclined wall 86B2 of the transmission unit 86) so as to constantly apply the load torque to the input gear 82 and the output gear 84.

Second Effect

In the case of the embodiment, the surface 86B on the output gear 84 side in the transmission unit 86 includes the pair of inclined walls 86B2 (see FIG. 6B). Then, the pair of inclined walls 86B2 is inclined such that the projection amount (which means the height projecting toward the output gear 84 side from the surface 86B, in the axial direction) continuously decreases over the downstream side from the upstream side in the direction of the forward rotation (the direction of the arrow in FIG. 6B) of the transmission unit 86. Therefore, during a period until the saw-teeth portion 82B fits into the saw-teeth portion 86A after the input gear 82 starts rotation, the coil spring 88 is continuously compressed and thus presses the input gear 82 with the gradually increasing force. That is, in this embodiment, in the period until the saw-teeth portion 82B fits into the saw-teeth portion 86A after the input gear 82 starts rotation, as time elapses, the saw-teeth portion 82B is pressed by the saw-teeth portion 86A with the stronger force.

Therefore, the OWC 76 according to the embodiment hardly generates the ratchet skip compared with the case where the inclined wall 86B2 is not formed in the transmission unit 86. Even a configuration where the inclined wall 86B2 is not formed in the transmission unit 86 achieves the first effect described above. That is, the configuration where the inclined wall 86B2 is not formed in the transmission unit 86 is also included in the technical scope of the disclosure.

Third Effect

The embodiment satisfies Formula 1 described above. Therefore, the OWC 76 according to the embodiment hardly generates the ratchet skip compared with a configuration that does not satisfy Formula 1. Even a configuration that does not satisfy Formula 1 achieves the first and second effects described above. That is, the configuration that does not satisfy Formula 1 is also included in the technical scope of the disclosure.

As described above, the disclosure is described with the embodiment as the example; however, the technical scope of the disclosure is not limited to the embodiment. For example, the technical scope of the disclosure includes the following configurations.

For example, while the embodiment has been described such that the output gear 84 outputs the torque transmitted to the input gear 82, the OWC 76 may be mounted to the holder 70 so as to engage the input gear 82 with the gear 74 and engage the output gear 84 with the gear 72A of the gear train 72.

While the OWC 76 according to the embodiment has been described as being connected to the pressure roller 62, the OWC 76 may be connected to the heating belt 61 (one example of another rotator), and the heating belt 61 may cause the pressure roller 62 (one example of another driven body) to be driven.

While the embodiment has described that the coil spring 88 is one example of the stretchable member, if the transmission unit 86 can be pressed to the input gear 82 in a compressed state (a shrunk state), one example of the stretchable member does not have to be the coil spring 88. For example, a plate spring, rubber, or other stretchable members may be employed.

While the OWC 76 according to the embodiment has been described as being connected to the pressure roller 62, it may be connected to, for example, the photoreceptor 51. In this case, since the photoreceptor 51 rotates around the shaft by being loaded by the cleaning apparatus 56, the photoreceptor 51 is a rotator that requires a high torque as the case of the embodiment.

While the embodiment has described that the input gear 82 and the output gear 84 are the spur gears, as modifications in FIGS. 9A, 9B, 9C, and 9D, the input gear 82 and the output gear 84 may be helical gears. In the case of the helical gear, in association with rotation of the input gear 82 and the output gear 84, the input gear 82 and the output gear 84 are likely to move in the axial direction. However, for example, the constitution that achieves the first to third effects described above in the embodiment reduces the ratchet skip. While in the modifications in FIGS. 9A, 9B, 9C, and 9D, any gear is a helical gear; any one of them may be a helical gear.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A one-way clutch comprising:
a first gear having one side in an axial direction on which a first ratchet portion is formed;
a second gear coaxially arranged with a shaft of the first gear, the second gear including a shaft portion, an outer peripheral portion, and a connection wall, the connection wall having a surface extending in the axial direction and connecting between the shaft portion and the outer peripheral portion;
a transmission unit arranged between the first gear and the second gear, the transmission unit transmitting a torque of one of the first gear and the second gear to another by rotating forward around the shaft, the transmission unit including a second ratchet portion that fits into the first ratchet portion on the first gear side, the transmission unit including an inclined wall that is inclined such that a projection amount continuously decreases over a downstream side from an upstream side in a direction of the forward rotation; and
a stretchable member arranged on a side opposite to the transmission unit by sandwiching the second gear, the stretchable member being stretchable in the axial direction and pressing a surface on the transmission unit side of the second gear to the inclined wall in a shrunk state,
wherein the one of the first gear and the second gear is configured to be an input gear, and the other is configured to be an output gear.

2. The one-way clutch according to claim 1,
wherein the stretchable member presses the second gear to the transmission unit with a pressing force F that satisfies the following Formula 1,
Formula 1: $F \geq F1 \times \tan X$,
here, F1 is a force that the second ratchet portion receives from the first ratchet portion in the axial direction when the transmission unit rotates forward, and X is an inclination angle of an inclined surface of the second ratchet portion with respect to the axial direction.

3. The one-way clutch according to claim 1,
wherein the stretchable member presses the second gear to the transmission unit so as to apply a load torque to the first gear and the second gear.

4. The one-way clutch according to claim 1,
wherein at least one of the first gear and the second gear is a helical gear.

5. A fixing device comprising:
the one-way clutch according to claim 1;
a driving source that rotates the input gear around the shaft;
a rotator that is connected to the output gear to rotate around the shaft; and
a driven body that forms a nip with the rotator and is driven by the rotator, wherein one of the rotator and the driven body heats a medium with a toner image formed that passes through the nip, and both apply a pressure to the medium to fix the toner image onto the medium.

6. An image forming apparatus comprising:
the fixing device according to claim 5; and
a forming unit that forms the toner image to be fixed onto the medium by the fixing device to the medium.

* * * * *